Sept. 23, 1958 T. L. SMITH 2,853,318
SLEEVE TYPE PIPE COUPLING WITH MEANS TO
PREVENT PINCHING OF THE GASKETS
Filed May 24, 1954 2 Sheets-Sheet 1
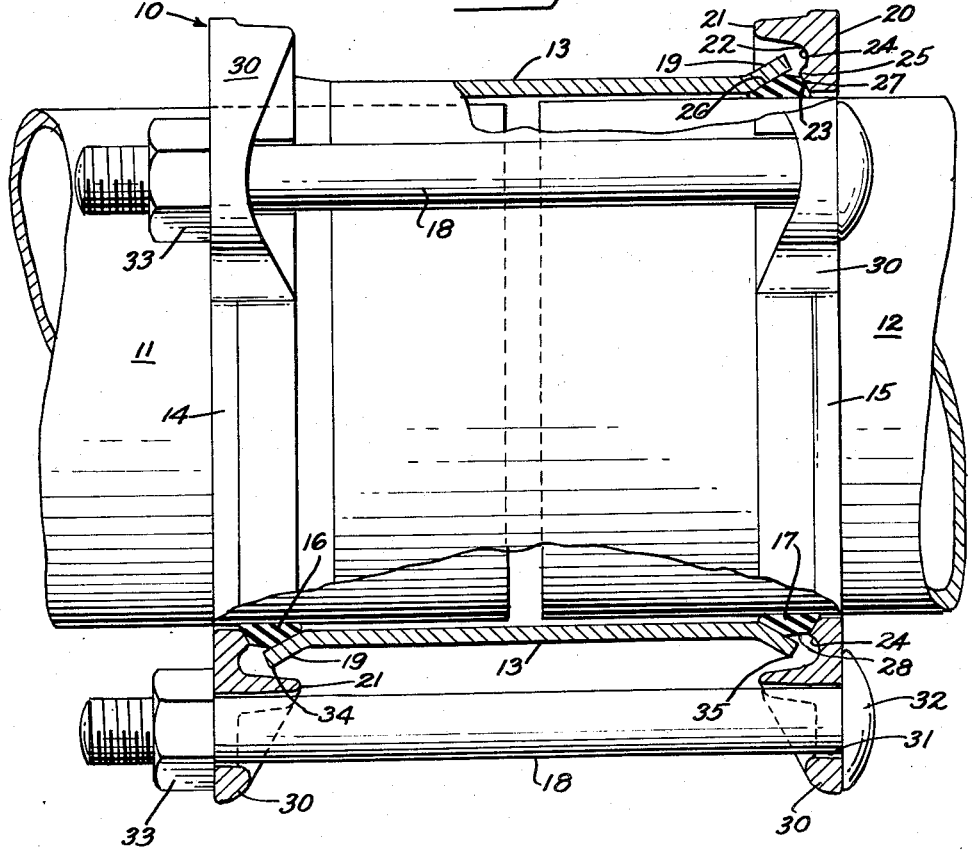
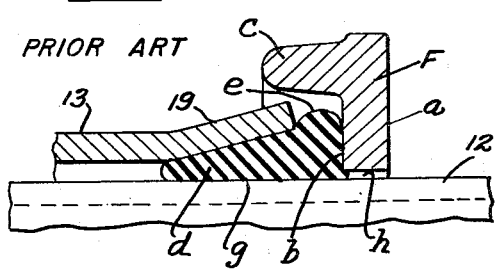
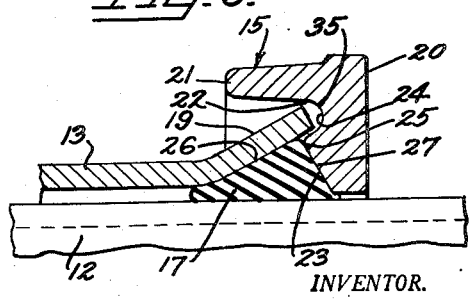
INVENTOR.
TELFORD L. SMITH
BY
ATTORNEY Sept. 23, 1958
T. L. SMITH
2,853,318
SLEEVE TYPE PIPE COUPLING WITH MEANS TO
PREVENT PINCHING OF THE GASKETS
Filed May 24, 1954
2 Sheets-Sheet 2
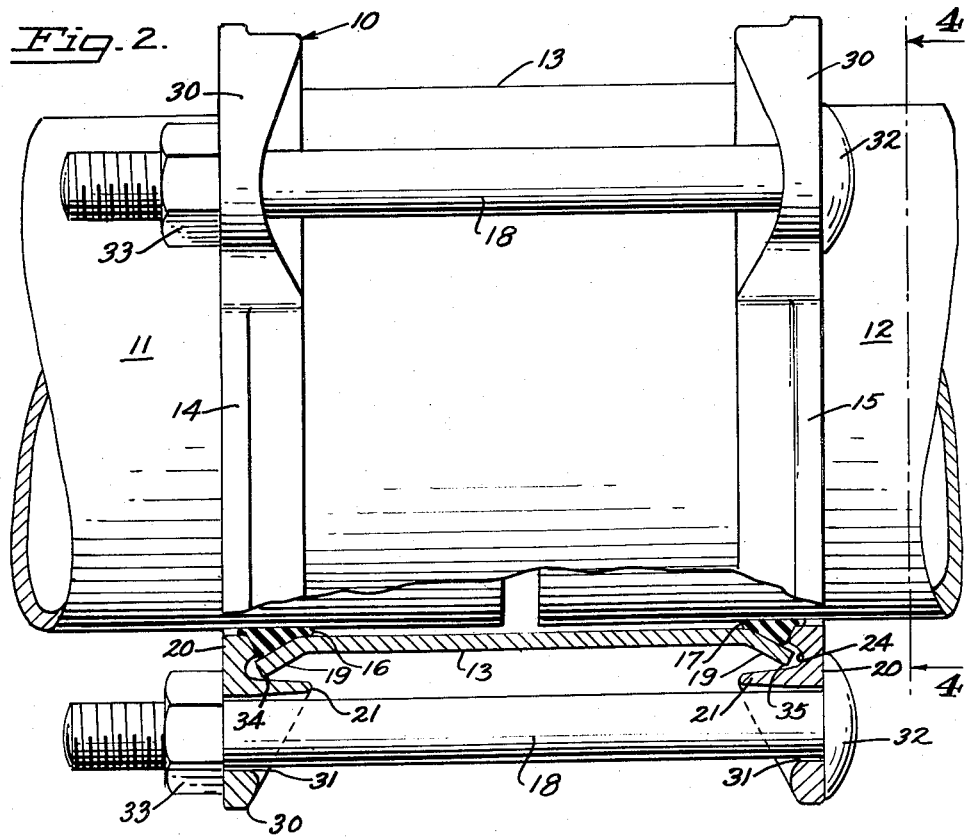
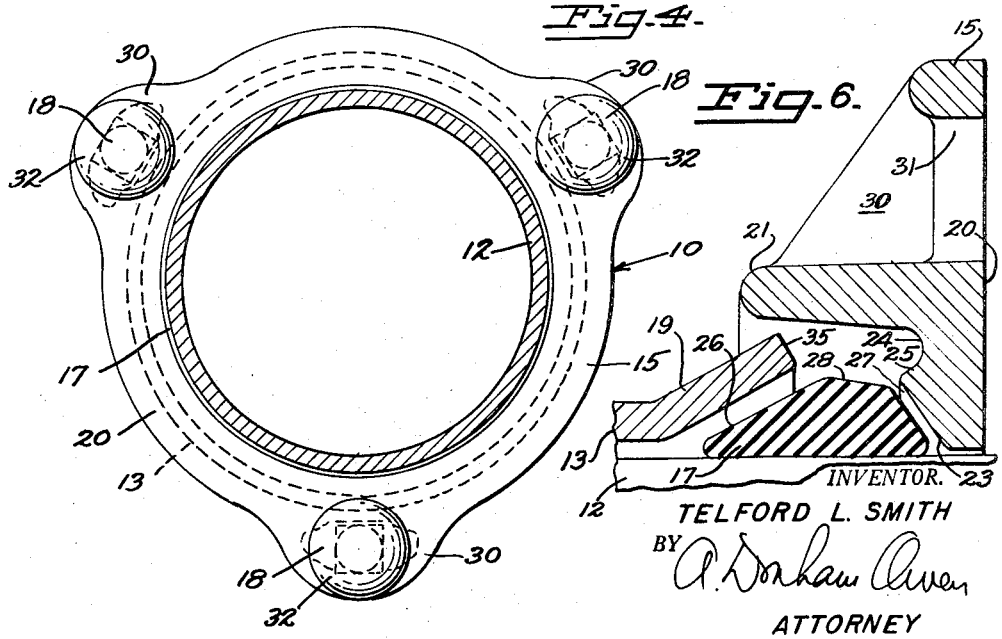
INVENTOR.
TELFORD L. SMITH
BY
ATTORNEY

United States Patent Office 2,853,318
Patented Sept. 23, 1958

2,853,318

SLEEVE TYPE PIPE COUPLING WITH MEANS TO PREVENT PINCHING OF THE GASKETS

Telford L. Smith, South San Francisco, Calif.

Application May 24, 1954, Serial No. 431,800

2 Claims. (Cl. 285—341)

This invention relates to improvements in pipe couplings of the type in which a pair of annular followers, one at each end of a cylinder sleeve, are forced in toward each other by tightening bolts that extend between them, and the sealing is accomplished at the ends of the sleeve by a gasket that is compressed between the followers, the sleeve, and the pipes.

In couplings of this type heretofore in use, it has been difficult to prevent leakage when the fluids are under high pressure. A great deal of torque has had to be applied to the tightening nuts, in order to retain the high pressure, and this torque has caused the inner periphery of the gasket to bulge into the space between the follower and the end sleeve, thereby pinching the gasket and preventing the tightening action from being fully effective, because the seal is made only at the point where the pinching occurs. This seal was water tight only between the follower and the sleeve, and this meant that it was possible for water to leak through the relatively loose fitting of the gasket against the pipe; and high pressure fluid usually did seep out there.

I have solved this problem by providing a novel follower and a novel gasket whose shapes cooperate to prevent the gasket from creeping or bulging out into a position where it can be pinched. Both the follower face and the gasket face that seal against it are tapered, and for co-action with my new follower, I form the gasket itself with a second taper which matches a taper formed in the follower. As a result, a wedging action is exerted on the gasket by both the follower and the sleeve, and this wedging action tightens the gasket in three directions simultaneously, that is, against the follower, against the sleeve, and against the pipe.

It is noteworthy that pipe couplings built according to my invention, differing from the prior art only as respects the shapes of the follower and the gasket, hold much higher pressures than prior art couplings and do so with lower torque. In a direct comparison made in an actual test, the prior art coupling was able to hold only 1,000 pounds of fluid pressure under 30 pounds of torque. In contrast my new coupling held 1600 pounds of fluid pressure with only 20 pounds of torque.

Other objects and advantages of the invention will appear from the following description in accordance with 35 U. S. C. 112.

In the drawings:

Fig. 1 is a view in side elevation and partly in section showing a pipe coupling embodying the principles of my invention about to be installed at and around the juncture of two pipes. The follower and sleeve are engaging the gasket but have not yet compressed it.

Fig. 2 is a view similar to Fig. 1, with the coupling fully tightened.

Fig. 3 is a fragmentary enlarged view in section, showing the appearance of the gasket and related parts after the coupling has been fully tightened.

Fig. 4 is a view taken along the line 4—4 in Fig. 2.

Fig. 5 is a view similar to Fig. 3 showing what happened in the prior art.

Fig. 6 is a view similar to Fig. 3 but somewhat enlarged, showing the relation of the gasket to the other parts before contact is made with those other parts.

The coupling 10 is used to join together sections of smooth-end cylindrical pipe, like the pipes 11 and 12 shown in Fig. 1.

The coupling 10 comprises a sleeve member 13, two followers 14, 15, two gaskets 16, 17, and bolts 18, 18, 18. The followers 14, 15 are identical, and one may be substituted for the other. The gaskets 16, 17 also are identical. Three bolts 18, 18, 18 have been shown, because they are sufficient for four-inch pipe and some larger sizes, but more may be used, if desired, especially with very large pipe.

The sleeve 13 is smoothly cylindrical except at each end where it is flared outwardly to give a generally frustoconical shell portion 19. This corresponds to prior art practice; in fact, my invention makes no change in the sleeve structure itself, but, due to my new combination, the sleeve 13 operates in a new way. As will soon be explained, it cooperates in a new and unexpected manner with the followers 14, 15 and the gaskets 16, 17 because the changes in the structure of those elements have affected the operation of the sleeve.

In the prior art (see Fig. 5) the followers F heretofore in use had a radial outer end wall $a$, a radial inner end wall $b$, and a projecting axial portion $c$. When the gasket $d$ was forced by the sleeve 13 between the follower F and the sleeve 13 (due to the tightening of the bolts) the gasket $d$ was forced up into a mound $e$ and was pinched between them. As the bolts were tightened still further, the mound $e$ grew. This mound $e$ served to relieve the pressure of the sleeve against the gasket $d$ and of the gasket $d$ against the pipe, so that fluid could leak between the gasket and the pipe flow along the line $g$, where the gasket was loose, and flow out of the coupling via the clearance space $h$ between the follower F and the pipe.

In my invention this seepage under pressure cannot happen because my followers 14, 15 are constructed differently, and so are my gaskets 16, 17. Each follower 14, 15, as shown in the drawings, has a radial outer end wall 20, are a generally axial projection 21, but the inner, generally radial wall 22 is no longer strictly radial. Instead, it has a tapered portion 23 which slopes out toward the opposite end of the sleeve 13 and its radius increases. Also, there is an annular recess 24 between the radially outer end 25 of the tapered portion 23 and the axial projection 21.

Similarly, each gasket 16 has a tapered portion 26 abutting the flared portion 19 of the sleeve 13, and a second tapered portion 27 abutting the tapered portion 23 of the follower. The gasket 16 also has a third tapered portion 28 in between the tapered portions 26 and 27. This portion 28 lies radially short of the recess 24, so that when the gasket 16 or 17 is compressed between the follower face 23 and the sleeve face 19, there is no bulge, and the rubber is in effect forced downhill along the tapered portion 28 instead of being pinched. All the corners of the gaskets 16, 17 are preferably rounded as shown to help this effect.

As in the prior art, the followers 14, 15 are also provided with a plurality of lugs 30, each having an opening 31 to receive a bolt 18 providing surfaces for the bolt head 32 and the nut 33 to bear against.

My new principle of operation is shown in Figs. 1, 2, and 3. When the clamp 10 is first assembled, the tapered portion 26 of the gasket rests against the flared portion 19 of the sleeve 13, and the tapered portion 27 of the gasket rests loosely against the tapered portion 23 of the follower, as in Fig. 1. As the nuts 33 are further tightened on the bolts 18, the followers 14, 15 are urged in towards each other and toward the ends of the sleeve 13 and the ends 34, 35 of the sleeve 13 ride in toward the followers annular recesses 24, and, as shown in Fig. 2, that is where they end when the clamp 10 is fully tightened. The action causes the gasket 14, 15 to be pressed toward the pipes 11, 12 from two directions: by the flared portion 19 of the sleeve 13, and by the tapered portion 23 of the follower, the angles being inclined in the opposite direction. The result is that the gaskets 16, 17 are tightened firmly against the wall of the pipes 11 and 12 as well as being sealed tightly against the followers 14, 15 and the sleeve 13. This means that almost the whole perimeter of each gasket 16, 17 is forced into sealing position, whereas in the prior art the pinched portion *e* received by far the greatest pressure, and the remainder of the gasket *d* was under a comparatively small sealing force.

Another important feature of the invention is that the ends 34, 35 of the sleeve enter the annular recesses 24 and end up in direct contact with the followers 14, 15, while at the same time fending away the gaskets 16, 17 during the movement into the recess. This is done partly by the downhill resolution of the radially outer portion of the jacket 16 or 17 along the tapered portion 28. As a result, when the gaskets 16, 17 are fully tightened, the face 28 has substantially disappeared without any bump being formed. This replaces the prior art formation of the bump *e* and directly prevents pinching.

The structural features of this invention have therefore enabled the improved coupling to get its maximum effect while, at the same time protecting the gasket from any undesirable action.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a coupling for cylindrical piping, said coupling having a sleeve of substantially constant thickness whose ends flare outwardly at a constant angle, the combination of a pair of followers at each end, each with a sloping axially inner face with its radially outer portion nearer the opposite follower than its radially inner portion but radially short of said sleeve ends; a pair of unitary gaskets, each having a plain cylindrical pipe-engaging face, a constant-sloping sleeve-end-engaging face radially short of said sleeve end, a constant-sloping follower-engaging face radially short of said follower, the sleeve-end-engaging face of said gasket extending radially outwardly beyond said follower-engaging face, and a gently sloping generally axial face joining the outer ends of said sleeve-end-engaging face and said follower-engaging face, for resolving pressure radially inwardly and toward said follower face when said coupling is tightened; and means for urging said followers toward each other so that said sleeve ends ride over said gasket and said followers' sloping portion without pinching said gasket, said gasket assuming practically a triangular section under full compression, without tending to squeeze up in between said follower and said sleeve.

2. A coupling for smooth-end cylindrical pipe including in combination a sleeve of substantially constant thickness having outwardly flared frusto-conical end portions; a follower at each end of said sleeve, whose axially inner face has a portion sloping toward the opposite said follower from its inner periphery outward, said sloping portion extending less far radially outward than said sleeve end; a unitary gasket adjacent each end of said sleeve, with a smooth cylindrical inner periphery adapted to seat on the pipe wall, a smooth sloping frusto-conical face in contact with the radially inner part of said flared sleeve end portion, a second smooth sloping frusto-conical face having substantially the same slope as, and in contact with, the radially inner part of the sloping inner face portion of the follower, the gasket face in contact with the sleeve end extending radially beyond the face in contact with the follower, and a third smooth face joining said two sloping faces at a constant slope in toward said follower face, so that when said coupling is tightened, pressure from the sleeve against the gasket is resolved downwardly along said third face to said second face and aids in forcing said inner periphery more tightly against said pipe; and means for urging said followers toward each other to tighten the coupling, said gasket being compressed into the generally triangular section bounded by the pipe, the sleeve end and the sloping follower end, the sleeve end riding over the end of the sloping portion of the follower with the entire gasket remaining within said generally triangular section where it cannot be pinched between the metal parts.

References Cited in the file of this patent

UNITED STATES PATENTS

| | | |
|---|---|---|
| 740,003 | Gillespie | Sept. 29, 1903 |
| 1,853,168 | Murphy | Apr. 12, 1932 |
| 2,105,022 | Wilson et al. | Jan. 11, 1938 |
| 2,106,829 | Christenson | Feb. 1, 1938 |
| 2,114,771 | Turner et al. | Apr. 19, 1938 |
| 2,561,887 | Risley | July 24, 1951 |
| 2,610,870 | Parmesan | Sept. 16, 1952 |
| 2,646,996 | Parmesan | July 23, 1953 |